March 8, 1949.　　　A. C. LUNDEMO　　　2,463,889
FISHING SPOON
Filed May 28, 1946
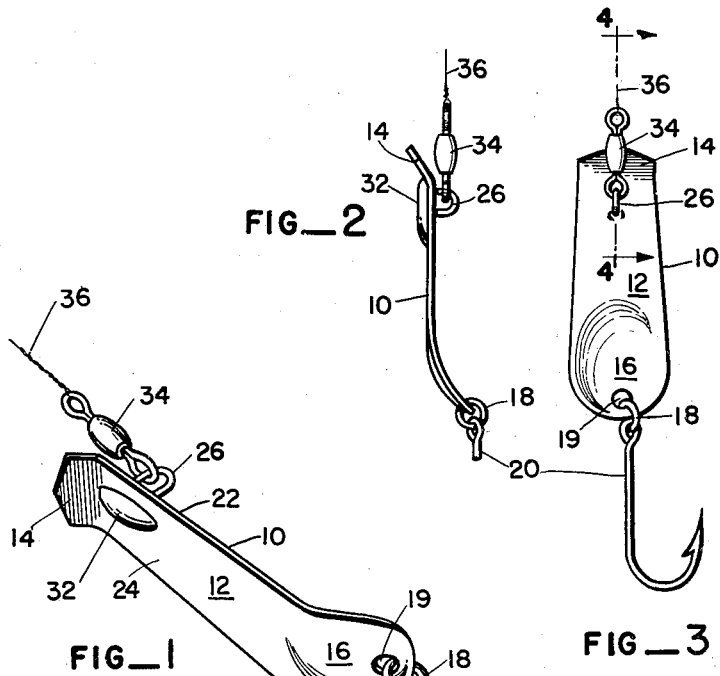
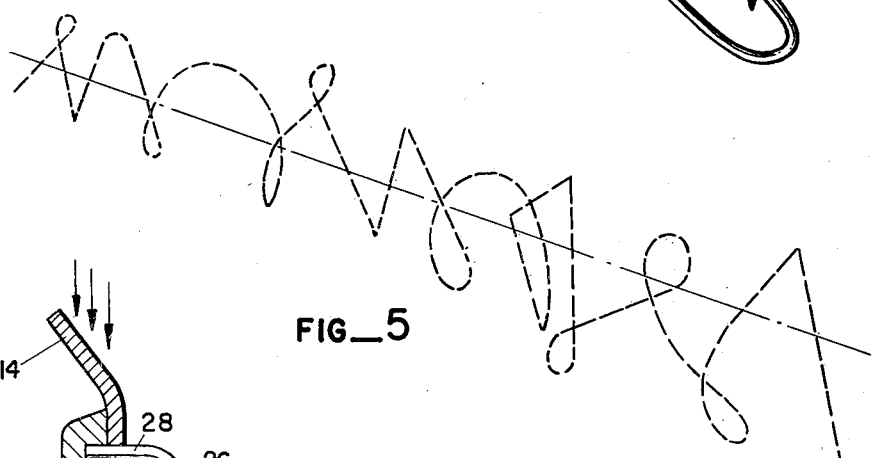
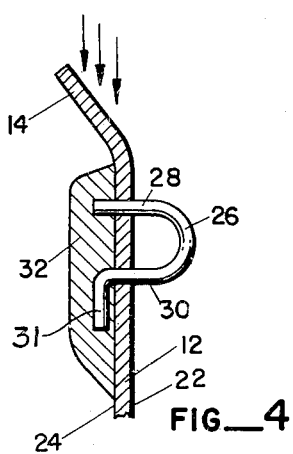
ALVIN C. LUNDEMO
Inventor
By Smith + Tuck
Attorneys Patented Mar. 8, 1949

2,463,889

UNITED STATES PATENT OFFICE 2,463,889

FISHING SPOON

Alvin C. Lundemo, Seabeck, Wash.

Application May 28, 1946, Serial No. 672,759

2 Claims. (Cl. 43—42)

This invention relates to a fishing spoon and, more particularly, to a spoon particularly designed to serve as an artificial bait for salmon or similar species of fish.

A prime object of the invention is to provide a spoon which improves upon this type of bait by securing new and unusual and novel results when the spoon is trolled through the water.

I show and describe hereafter the combination of elements which operate effectively as a lure or bait by reason of a peculiar and distinctive action obtained. This action comprises an infinite variety of lateral dashes and turns and twists of the spoon in an infinite number of directions about a roughly defined axis along which the spoon is trolled. These digressions are particularly characterized by being unrhythmical and erratic and it is believed that this action is such as to make the spoon superior in luring and attracting fish during trolling.

Thus it can be seen that another important object of the invention is to provide a fishing spoon which avoids rhythmic rotation or wobbling or pivoting and which produces an infinitely variable erratic action.

In addition to the action of my spoon in the water, it has the further advantages of being simple to construct, and when constructed, very simple to use. In short, it is marked by a total absence of complicating physical elements which would otherwise tend to foul or tangle in the line or leaders or with other parts of the fishing gear in an undesirable manner.

The pivotal center of the movement of the spoon is about an eye in a swivel, or otherwise provided at the end of a fishing line. This eye does not necessarily travel in a truly straight line, since the spoon will deflect as it passes through the water and be redeflected by reason of an overbalancing weight so that it will dart and dive and turn and twist laterally of the general direction of movement in a most unusual manner.

Still another advantage of the invention is to provide a spoon which is easily cleaned and avoids abrupt corners or other features in which tarnish and foreign matter can accumulate so that an operator will have difficulty in maintaining brilliancy in the care of his gear.

My invention is thought to reside particularly in the provision of a joggle-shaped spoon which is adapted for attachment to a trolling line from a mid or intermediate position and which will have associated adjacent its point of attachment an over-balancing weight as mentioned above. It will be apparent to those skilled in the art that alterations and modifications can be made in the practice of this invention without departing from the scope of the invention as defined by the claims hereafter.

A further object of this invention is the provision of a spoon and hook combination capable of carrying a piece of bait without impairing the action of the spoon and for the purpose of increasing its attractiveness to fish.

In the drawing:

Fig. 1 is a perspective view obliquely from the rear of my fishing spoon;

Fig. 2 is a side view showing the joggle-shaped spoon of Fig. 1;

Fig. 3 is a face view of my fishing spoon;

Fig. 4 is an enlarged sectional view taken on lines 4—4 of Fig. 3 with portions omitted for convenience of illustration; and Fig. 5 is a schematic representation of a typical course through the water described by my spoon during trolling.

The spoon is formed preferably of thin sheet metal which is cut and shaped to provide an elongated body. The spoon, designated as a whole by the numeral 10, comprises an intermediate or joggled portion 12 the sides of which tend slightly to converge in their forward projection. A forward, flat portion 14, integral with the intermediate portion 12, is positioned obliquely or at an obtuse angle to the general plane of portion 12. A rear portion 16, here shown to be cupped slightly by depression and curves formed in the metal, is also disposed obliquely or at a slight obtuse angle to the rear end of mid-portion 12. The general arrangement of the portions 14, 12 and 16 I prefer to describe as being joggle-shaped. It will be apparent that the trailing portion 16 need not necessarily be cupped, but can be planar similar to the forward portion 14.

By means of the ring 18 passing through the opening 19 in the rear end of the trailing portion 16, I attach a barbed fishing hook 20 by which a fish which strikes at the bait is gaffed or caught.

The middle portion is shown as having the front face 22 and the back face 24. Outstanding from the front face 22 is a wire staple or eye 26 having shanks 28 and 30. As can best be seen in Figure 4 the shanks 28 and 30 pass through the mid-portion 12 of the spoon. At least one staple end, as 30, has an angular extension 31 which lies substantially parallel to the intermediate portion 12, preferably in slightly spaced apart relation. The staple ends are anchored in position by an upsetting or overbalancing weight 32 of substantial proportions which is fused to the back face 24 of the spoon. Weight 32 is usually of lead and weighs from 20 to 50% of the spoon weight.

A swivel 34 is attached to the eye 26 on its forward end to the trolling line 36.

When the line 36 is trolled from behind the motor boat or the like, the spoon will follow through the water. The force of such water operates upon the front or leading face of the forward portion 14 in the manner suggested by arrows in Figure 4. This tends to cause the spoon to swing about its pivotal connection to eye 26 engaged with the swivel 34. Such swinging, for a moment, causes the trailing portion 16 to move to the right. Under such circumstances, both the pressures against the forward face of the mid-portion 12 and the concave face trailing portion 16 will then become effective to swing the spoon backward to a normal straight-line position. This, however, is upset or overbalanced by the functioning of the weight 32 which is substantial and is so located adjacent the root of the eye 26 as to be very effective in causing the spoon to swing and swivel and turn and dash and twist in its operation in the manner suggested in Figure 5. The action can only be described as being most erratic and of an infinite number of variations, such that careful observation indicates practically no cycle of repetition in any series of such movements.

I have found that my spoon readily will carry a piece of bait, such as a small section of herring, or the like, without impairment of its variable wobbling action as it and the water move relative to each other. The joggle-shape, together with the off-center weight 32 permit such baiting. It is my observation that trout and salmon, when they are feeding on herring or candle-fish, will strike more readily on such a baited spoon than on a bare one, yet others than mine will not readily carry bait as desired.

It is my personal observation that this spoon appears to be most attractive to salmon and similar fishes, to such an extent as to make it a superior lure or artificial bait for persons seeking such fishes.

Although I have shown and described a specific embodiment of my invention, I am fully aware that many modifications thereof are possible. My invention, therefore, is not to be restricted except insofar as is necessitated by the prior art and by the spirit of the appended claims.

Having thus described my invention, I claim:

1. A fishing spoon of elongated shape having a flat intermediate portion, a flat end portion extending at an angle from said intermediate portion at one end, and a concave portion extending from said intermediate portion in opposite angular relation to said flat end portion; a staple extending through the intermediate portion adjacent the flat end portion, said staple having one end thereof extending away from the remainder of the staple and substantially parallel to the intermediate portion, and a weight mounted on the staple and maintained in close relation to the intermediate portion by the one end of the staple, said weight being also in fused relation to the staple and intermediate portion.

2. A fishing spoon, of elongated shape having a flat intermediate portion, a concave rear portion, and a flat front portion; a staple extending through the intermediate portion adjacent the front portion, said staple having one end thereof extending rearwardly of the remainder of the staple and substantially parallel to the intermediate portion, and a weight mounted on the staple and maintained in close relation to the intermediate portion by the one end of the staple, said weight being also in fused relation to the staple and intermediate portion.

ALVIN C. LUNDEMO.

REFERENCES CITED

The following references are of record in the file of this patent:

UNITED STATES PATENTS

| Number | Name | Date |
|---|---|---|
| 1,833,581 | Jordan | Nov. 24, 1931 |
| 1,862,917 | Anderson | June 14, 1932 |